(12) United States Patent
Orava

(10) Patent No.: US 6,829,288 B2
(45) Date of Patent: Dec. 7, 2004

(54) COMMUNICATION SYSTEM HAVING WIRELESS DEVICES SUPPORTING AD HOC CONNECTIONS INDEPENDENT OF THE PROTOCOL VERSION

(75) Inventor: Pekko Orava, Tampere (FI)

(73) Assignee: Nokia Corporation, Espoo (FI)

( * ) Notice: Subject to any disclaimer, the term of this patent is extended or adjusted under 35 U.S.C. 154(b) by 732 days.

(21) Appl. No.: 09/733,097

(22) Filed: Dec. 11, 2000

(65) Prior Publication Data

US 2002/0071477 A1 Jun. 13, 2002

(51) Int. Cl.⁷ .............................................. H04B 1/707
(52) U.S. Cl. ...................................... 375/132; 375/132
(58) Field of Search ................................ 375/343, 322, 375/142, 144, 132, 334, 316, 133, 150, 148, 340; 455/323, 41.2, 519, 403; 340/7.6; 370/522

(56) References Cited

U.S. PATENT DOCUMENTS

| | | | | |
|---|---|---|---|---|
| 5,521,937 A | * | 5/1996 | Kondo et al. | 375/144 |
| 6,122,310 A | * | 9/2000 | Ziemer et al. | 375/142 |
| 6,218,958 B1 | * | 4/2001 | Eichstaedt et al. | 340/7.6 |
| 6,298,227 B1 | * | 10/2001 | Molnar | 455/323 |
| 6,366,622 B1 | * | 4/2002 | Brown et al. | 375/322 |
| 6,643,336 B1 | * | 11/2003 | Hsieh et al. | 375/343 |

FOREIGN PATENT DOCUMENTS

WO   WO 95/08888   3/1995

OTHER PUBLICATIONS

Prasad et al, Ramjee, "An Overview of CDMA Evolution Toward Wideband CDMA," IEEE Communications Surveys, vol. 1, No. 1, 1998, pp. 2–29.
Bluetooth: "Baseband Specification"—Specification of the Bluetooth System V1.0 B, Dec. 1, 1999, pp. 33–184, XP002228860.

* cited by examiner

Primary Examiner—Stephen Chin
Assistant Examiner—Ted Wang
(74) Attorney, Agent, or Firm—Antonelli, Terry, Stout & Kraus, LLP

(57) ABSTRACT

A wireless device, for use in an ad hoc network and a communication system therefor having ad hoc networks feature one or more such devices having a transceiver including a receiver portion which simultaneously correlates (33, 34 in FIG. 3) an access code of an incoming data packet against that associated with plural wireless protocol versions, supported by that wireless device (BT), in a manner permitting a linkup between that wireless device and any of the other devices, the other devices including ones which are programmed to correlate against any single one of the protocol versions, as well as ones which are programmed to simultaneously correlate against the referred-to plural protocol versions. As an example, the receiver portion employs as many parallel-connected correlators as are the number of wireless protocol versions such wireless device supports simultaneously. There is also featured a method for facilitating an ad hoc connection between different ones of plural wireless transceiver devices which are supported by different protocol versions.

34 Claims, 5 Drawing Sheets

COMMUNICATION SYSTEM HAVING WIRELESS DEVICES SUPPORTING AD HOC CONNECTIONS INDEPENDENT OF THE PROTOCOL VERSION

FIELD OF THE INVENTION

This invention relates, generally, to the field of telecommunications/mobile terminals and, more particularly, it relates to the development of an architecture which allows mobile (wireless) terminals and the like to communicate and coexist independent of the protocol version.

BACKGROUND OF THE INVENTION

Increasingly, companies, corporations, organizations or associations and the like and even individuals are finding more and more that wireless communication is becoming an indispensable addition to the more traditional wired versions to satisfy the needs for mobility, relocation, ad hoc networking, and coverage of locations difficult to wire. Recently, a new technology has been developing which can expand the use of mobile (portable) phones and related hand-held mobile terminals using the same ISM (industrial, scientific and medical) band as that employed by the wireless LAN (local area network) communication which conforms to the IEEE 802.11 standard. This new technology is known as the Bluetooth wireless technology which is a low-powered radio technology which allows users to make effortlessly, wireless and instant connections between various communication devices, such as mobile (wireless) phones and desktop and notebook computers and the like. A communication linkup operating under the Bluetooth system, such as based on the standard dated Nov. 29, 1999, operates on the unlicensed (free) 2.4 GHz ISM frequency band. In the vast majority of countries (including USA, Europe and most other countries) this frequency band actually is 2400–2483.5 MHz. The Bluetooth special interest group (SIG), which is a consortium of leading companies in the related industries, has launched a campaign to achieve total harmonization of the frequency band.

The sophisticated mode of transmission adopted in the Bluetooth specification ensures protection from interference and security of data. A frequency hop transceiver is applied to combat interference and fading. A shaped, binary FM modulation is applied to minimize transceiver complexity. The symbol rate is 1 Ms/s. A slotted channel is applied with a nominal slot length of 625 $\mu$s. For full duplex transmission, the time-division duplex (TDD) scheme is employed. With regard to channel linkup, information is exchanged through packets. Each packet is transmitted on a different hop frequency.

The Bluetooth protocol uses a combination of circuit and packet switching. Slots can be reserved for synchronous packets (e.g., voice traffic). Bluetooth can support an asynchronous data channel, up to three simultaneous synchronous voice channels or a channel which simultaneously supports asynchronous data as well as synchronous voice. Asynchronous data traffic corresponds to an ACL (asychronous connection-less) link while sychronous traffic is associated with voice traffic and is supported by an SCO (synchronous connection-oriented) link.

The Bluetooth specification has two power levels defined, namely, a lower power level that generally covers the small surroundings such as within a room, and a higher power level that can cover a medium range, such as within a home. That is, conventionally, software controls and identity coding built into each microchip ensure that only those units preset by their owners can communicate.

Wireless devices which conform to Bluetooth technology are supported by a Bluetooth system, such as 10 shown in FIG. 1 of the drawings, consisting of a radio unit 11, a link control unit 12, and a support unit for link management and host terminal interface functions 13. The link controller (LC) in the Bluetooth system (also referred to as the baseband section) describes the specifications of the digital signal processing portion of the hardware, that is, the Bluetooth link controller carries out the baseband protocols and other low-level link routines. As to the link manager (LM), it is a software entity which carriers out link setup, authentication, link configuration and other protocols. The link manager discovers other remote LMs and communicates with them via the link manager protocol (LMP). Details regarding the servicing by a link controller and link manager have been standardized by the Bluetooth SIG.

Software interoperability begins with the Bluetooth link level protocol responsible to the protocol multiplexing, device and service discovery and segmentation and reassembly. Bluetooth devices must be able to recognize each other and load the appropriate software to discover the high level abilities each device supports. This is all supported by Bluetooth software framework. Interoperability at the application requires identical protocol stacks. Different classes of Bluetooth devices including (although not limited thereto) PCs, hand-helds, PDAs (personal digital assistants), headsets, mobile/cellular phones have different compliance requirements. For example, you would not expect a Bluetooth headset to contain an address book. Headsets compliance implies Bluetooth radio compliance, audio capability, and device discovery protocols. More functionality would be expected from cellular phones, hand-held or notebook computers. In order to achieve this interoperability, the Bluetooth software framework employs a complete protocol stack which comprises both Bluetooth specification protocols like LMP and L2CAP (logical link control and adaptation protocol) and non-Bluetooth-specific protocols like OBEX (object exchange protocol) and UDP (user datagram protocol), etc. In designing the protocols and the whole protocol stack, according to the present Bluetooth standard, the main principle has been to maximize the re-use of existing protocols for different purposes at the higher level, instead of "re-inventing the wheel" once again. Thus, the open specification afforded by the Bluetooth protocol stack permits the development of a large number of new applications that take full advantage of the capabilities of the Bluetooth technology.

The Bluetooth system provides a point-to-point wireless connection, in which two Bluetooth units are involved. FIG. 2A of the drawings illustrates a point-to-point linkup involving wireless device $BT_M$, which has taken the role of the master, and wireless device $BT_S$, which is the slave in this connection. Other types of connections, which may be referred to as WPANs (wireless personal area networks) can also be effected under the support of a Bluetooth system. For example, FIG. 2B shows a point-to-multipoint connection 21 in which the channel is shared among several Bluetooth units. In this example, wireless device $BT_M$ represents the master unit and devices $BT_{S1}$–$BT_{S7}$ represent the slave units, which are linked to the channel access code set by the master device.

In an ad hoc or WPAN linkup scheme such as shown in FIG. 2B, in which two or more units share the same channel, the ad hoc network is referred to as a piconet. A piconet may begin with two connected devices, such as a portable PC (Personal Computer) and a cellular phone, and may grow to eight connected devices, which device may also be identical. However, once a piconet is formed, one unit will act as a master and the remainder as the slaves for the duration of the piconet connection. It should be noted, at present, a piconet is limited to seven slaves. However, many more slaves are able to remain locked to the master of the piconet in a so-called parked state. These parked slaves cannot be active on the channel but may remain synchronized to the master. Both for active and parked slaves, the channel access is controlled by the master.

Multiple piconets with overlapping coverage areas form a scatternet. In this situation, each piconet can only have a single master. However, slaves are able to participate in different piconets on a time-division multiplex basis. In addition, a master in one piconet can be a slave in another piconet. The piconets shall not be time- or frequency-synchronized. Each piconet has its own hopping channel. FIG. 2C of the drawings is an example of a scatternet 22 involving overlapping coverage areas of a number of piconets. In this example of scatternet, 23, 24 and 25 are separate piconets which have one or more devices as components of more than one piconet. It is noted that device $BT_S/BT_M$ acts as a slave in piconet 23 and as the master of the point-to-point linkup 24.

Wireless devices such as mobile/cell phones, as one example of a wireless device, will no longer have to be limited to, for example, a basic service set in a base station sub-system (BSS) link, which typically consists of a number of stations executing the same Medium Access Control (MAC) protocol in competing for access to the same shared medium. In a wireless local area network (WLAN) linkup, a single access transceiver can support a small group of co-located users within a range of less than one hundred to several hundred feet, typically. On the other hand, Bluetooth technology will enable users to connect their mobile computers, digital mobile/cell phones, handheld devices, network access points and other mobile devices by wireless short-range radio links, unimpeded by line-of-sight restrictions using substantially less power. Bluetooth technology will increase the ease of wireless communication by the ordinary citizen, as well as the scope of wireless connectivity. Also, since Bluetooth is limited to short range communication, typically, under 10 meters, for example, 2–3 meters, it requires a very little power level. As stated earlier, however, the range may be extended to a 100 meters or more through simply increasing the transmit power level. Simply put, this Bluetooth technology enables portable electronic devices to connect and communicate wirelessly by a short range, ad hoc networks.

In order to function on a worldwide basis, Bluetooth requires a radio frequency that is license-free and open to any radio. When the Bluetooth radio is applied to a mobile phone, the user can leave the mobile phone clipped to his belt or in a pocket and walk around for the entire dial-up-connection. Also, because there are no line-of-sight requirements for Bluetooth devices, it is well suited for wireless connectivity, such as between a mobile phone and a notebook computer or between two mobile phones. For example, with Bluetooth, a person could synchronize one's phone with a PC without taking the phone out of one's pocket or briefcase. The users would automatically receive E-mail on their notebook or laptop computers by the digital cellular phones in their pockets or synchronize their primary PC with their hand-held computer without taking it out of their briefcase.

The omni-directional capability of Bluetooth allows synchronization to start when the phone is brought into the range of the PC. It allows for a gross data rate of one megabits per second, with second generation plans to be increased to a higher data transmission speed. It uses packets switching protocol based on a frequency hopping scheme, namely, frequency hopping spread spectrum (FHSS). Also, because of its omnidirectionality, authentication and encryption is also included, for security reasons, as part of the baseband protocol. That is, authentication relies on utilizing a secret key (i.e., password or PIN), thereby assuring security.

With the further refining of the standard as well as the emergence of new standards in the telecommunications fields including, although not limited thereto, the Bluetooth SIG standard, any previous or even the current Bluetooth specification (released on Nov. 29, 1999) does not provide for an architecture allowing wireless devices (wireless terminals or wireless transceiver devices) to communicate and coexist independently of the protocol version. In the earlier as well as in the present standard, there is no provision for any straight forward ways of making revisions to support plural (different) protocol versions including, for example, a previous (old) protocol version as well as a newly implemented, more advanced version, simultaneously. Although the receiver of a wireless transceiver unit, for example, correlates against the device access code (i.e., the receiver listens for its own DAC for the duration of the scan window) when in the page scan substate, and similarly correlates against the Inquiry Access Code (IAC) when in an inquiry scan mode, it is limited to linkups with only compatible protocol versions. That is, if a wireless device which is supported by an old protocol version is attempting to discover (i.e., linkup with) all wireless devices (e.g., mobile phones, etc.) located in a given range, it would not be able to locate devices having a revised or more advanced protocol version.

Conventionally, wireless devices belonging to one piconet network use one access code. For example, a Bluetooth receiver employs correlation which conforms to a preset protocol which defines the particular channel access code associated therewith. That is, each Bluetooth packet has a channel access code field in the packet header. Devices belonging to one ad hoc network use one access code while devices in other networks use other access codes. The access code is derived from the device identity code of the network master node. Accordingly, all the networks have unique access codes and thus can coexist in the same physical space without logically colliding. Some access codes have been reserved for the network management functions. However, due to the development of new or more advanced protocol versions, wireless devices are being manufactured which may not be able to be communicated with older version devices or devices having a different protocol version.

SUMMARY OF THE INVENTION

The present invention is directed to a communication system for providing one or more networks and including wireless devices which operate on certain radio frequencies. In accordance with such a scheme, at least one of those wireless devices in the network includes a transceiver having a receiver portion which simultaneously correlates an access code of an incoming data packet against the access code field associated with plural wireless protocol versions, supported by that wireless device, in a manner to permit a linkup between that wireless device and any of the other wireless devices, the other wireless devices including ones which support a linkup in accordance with only one of those wireless protocol versions. Such a simultaneous correlation is able to simultaneously distinguish between different access codes. According to the invention, the receiver portion of each wireless device that supports at least two wireless protocol versions includes as many correlators as are the number of wireless protocol versions that wireless device supports simultaneously. The different protocol versions involved may support devices which operate, as one example, on an ISM frequency band, although not limited thereto, where one such protocol version thereof may be limited to an earlier version (or standard) while the other may correspond to a more advanced protocol version. The ISM frequency band may be the 2.4 GHz ISM radio band for frequency hopping spread spectrum (FHSS) communication including conforming to the Bluetooth standard, although not limited thereto.

In accordance with one aspect, the receiver portion of each wireless device supporting plural wireless protocol versions features an RF modem which is coupled to an antenna port and which transmits the received signal to a demodulator where the signal is demodulated and is to be sampled as a packet data; at least two correlators which are simultaneously fed with a packet bit stream of the demodulated signal, these correlators which correspond in number to the number of wireless protocol versions supported by each such wireless device correlate (match) the access code of the packet bit stream to that one of the correlators programmed with a matching protocol; a sampler which samples and synchronizes the timing of the packet bit stream to the matched protocol; and in accordance with the outcome of the correlation, a sample bit stream is transmitted via a protocol matching parser to the appropriate buffer registers. The protocol matching parser may be in the form of a plurality of packet de-composers equal in number to the number of correlators such that each of the packet de-composers is programmably matched to a respective correlator on the basis of the protocol.

The lack of a protocol version field in the frame structure is circumvented through the addition of at least one more correlator, operating in parallel, in order to support at least two different protocol versions simultaneously. One such correlator may be programmed for an older access code or older inquiry access code while the additional correlator is programmed with the newer or revised access code or revised inquiry access code. That is, in accordance with a featured aspect of the present invention, the device listens to two or more different access code simultaneously, depending on the number of simultaneous correlations being effected. The access codes derived from the identifiers of the old and the revised protocol are programmed into the correlators. Both the correlators simultaneously receive the same data packet. On the basis of the matching effected by the simultaneous correlation, a selection is made as to whether the receiver is to handle the incoming bit stream according to the old or to the revised protocol.

The invention also features wireless devices having receivers that simultaneously correlate the codes of incoming data packets against that associated with plural wireless protocol versions, supported by each such wireless device, such that ad hoc linkups can be effected between that wireless device with other wireless devices which support only a single one of the protocol versions.

The invention also features a method which facilitates, in a communication system, an ad hoc connection between different ones of plural wireless transceiver devices which are supported by different protocol versions. In order to achieve such an ad hoc connection, the method calls for providing at least one such wireless transceiver device with a receiver portion to simultaneously correlate an incoming data packet against a plurality of protocol versions; synchronizing the timing of a sampling of the incoming data packet to produce a packet bit stream conforming to the protocol version matched by the simultaneous correlation; and on the basis of the matching effected by the correlation, transmitting the packet bit stream via a protocol matching parcer to either asynchronous data signal buffer registers or synchronous voice signal buffer registers or both, depending on the type of packet bit stream. If the packet bit stream consists of asynchronous connection-less (ACL) data packets, the parser (or packet de-composer) sends the packet bit stream to the asynchronous data signal buffer registers. If the packet bit stream consists of only synchronous connection-oriented (SCO) data packets then it is sent to the synchronous (voice) signal buffer registers. If the SCO packets are such that they carry both data and voice traffic, then they are appropriately parsed (separated) for storage in the corresponding ones of the registers.

In accordance with the present invention, total isolation of the protocol versions is maintained while allowing seamless coexistence and cooperation between different devices in the same network which may support different protocol versions. In accordance with the present invention, limitations are not placed on the protocol modifications due to the total isolation of the different protocol versions. For example, consider a revised master device in an ad hoc point-to-multipoint linkup. The master device (master node) controls the operation of all the slaves in that network. The revised slaves (which support plural wireless protocol versions through having at least two programmable correlators) respond to both the revised access code (RAC) and the access code of the original protocol version (OAC). Other slaves in that network, however, which are compliant only with regard to the old protocol version respond only to the access code of the original protocol version (OAC). Transmission which is under the RAC appears to the devices which are compliant only with the old protocol version as interference from some other network and, therefore, is ignored. During the normal operation, there is thus no risk of mixing the old and revised protocol version. Those devices which are compliant in accordance with the revised protocol version, according to the present invention, can support both protocol versions simultaneously.

The above set forth and other featured aspects of the invention are made more apparent and are further described in the ensuing detailed description of example embodiments and the claims when read in connection with the accompanying drawings, all forming part of the disclosure of this invention. While the foregoing and following illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings wherein:

DETAILED DESCRIPTION

The current Bluetooth specification does not call for a dual correlator operation during normal (Bluetooth specification compliant) operation. Accordingly, there is no need to search for inquiry access code (IAC) while searching for channel access code (CAC). However, as earlier discussed, a receiver which is compliant with another or revised protocol version must be facilitated with at least two correlators operating in parallel such that the wireless device (or wireless transceiver device) can support both protocol versions simultaneously. One such correlator is programmed for an access code according to one protocol version while the second is programmed with a second protocol version which may then be revised from that of the original protocol version even while the wireless device remains Bluetooth compliant.

Figure 3:
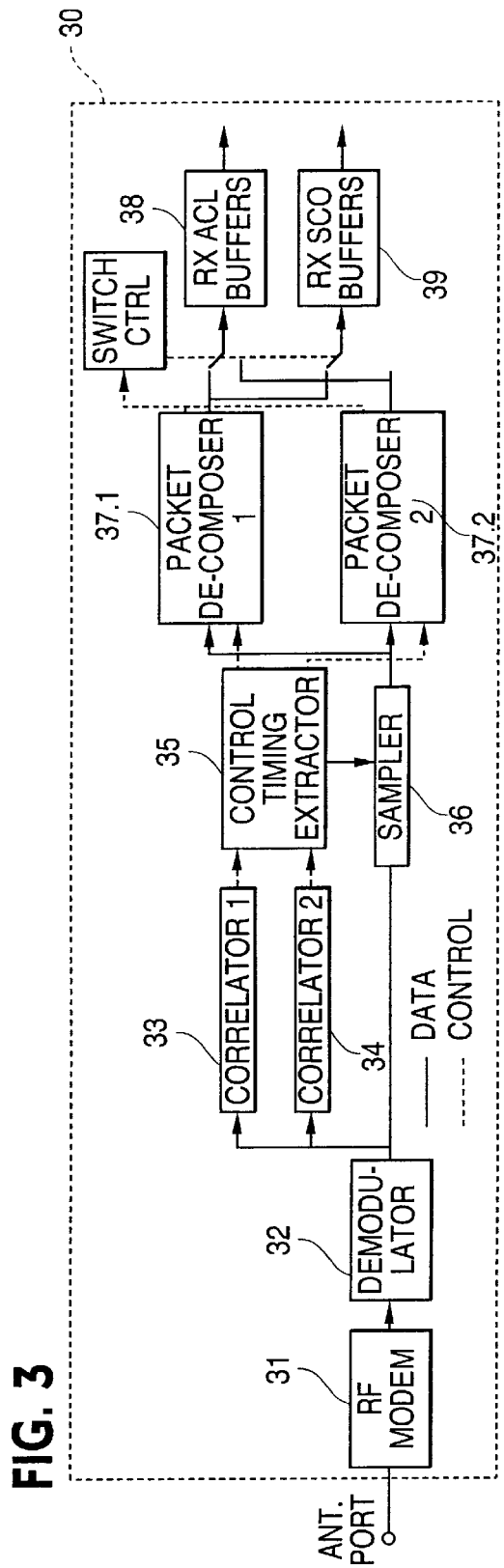
FIG. 3 illustrates one example of plural correlation schemes for a receiver portion in a wireless device according to the present invention.

FIG. 3 illustrates a dual correlation scheme in a receiver portion of a wireless device according to the present invention.

Figure 4A:
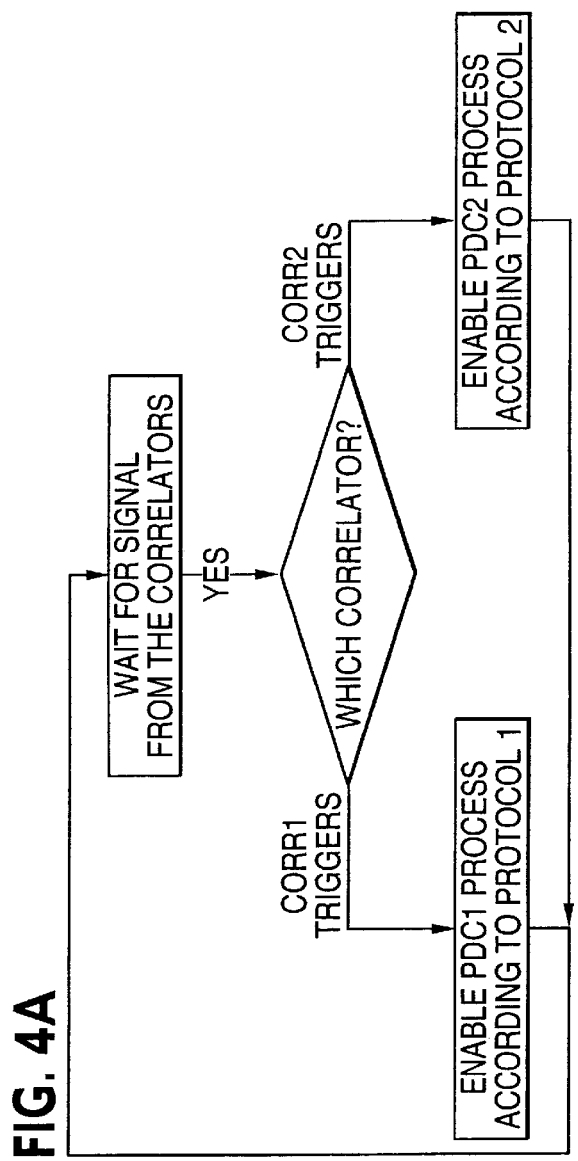
FIG. 4A is a flowchart depicting the functionality of the control and timing extractor in the dual correlation scheme of FIG. 3.
Figure 4B:
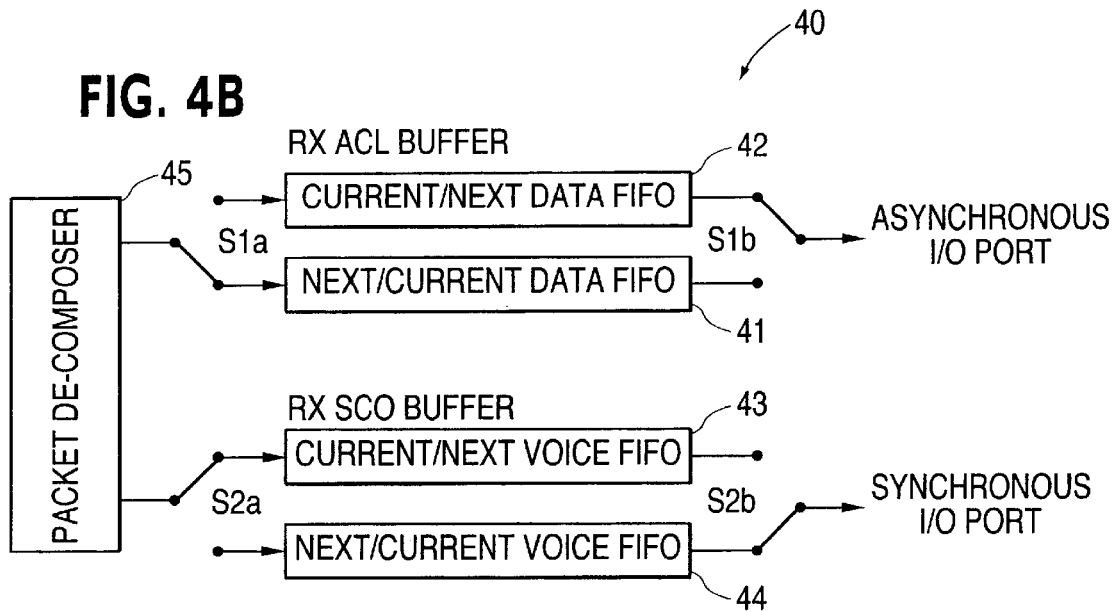
FIG. 4B illustrates further details of the functional diagram associated with receiver (RX) buffering and, particularly, the ACL and ACO buffers as used in the RX routine, applicable to the present invention.

FIG. 4A is a flow chart which depicts the functionality of the control/timing extractor of FIG. 3, while FIG. 4B illustrates further details of the functional diagram associated with the receiver (RX) buffering as applied to each packet decomposer in FIG. 3. Before further discussion is given, however, regarding these illustrations, the following related discussion is provided.

Figure 5A:
FIGS. 5A, 5B and 5C show the entities of a standard packet format, an access code format and a format of a device ID in a Bluetooth-compliant scheme, respectively, applicable to the present invention.

The data on the piconet channel is transmitted in packets. FIG. 5A of the drawings illustrates the general packet format. Each packet consists of three entities, namely, the access code, the header and the payload. The access code and header are of affixed size: 72 bits and 54 bits, respectively, while the payload can range from 0 to a maximum of 2745 bits. The format associated with a packet is such that the least significant bit (LSB) is the bit that is sent first over the air while the most significant bit (MSB) in each of the entities is the last bit transmitted. Different packets may consist of simply the access code only, which is simply the identity (ID) packet consisting of the device access code (DAC) or the inquiry access code (IAC), which would strictly have a length of 68 bits. This ID packet is a very robust packet which is used by the correlator in the receiver to match the receipt packet to the known bit sequence of the ID packet. The packet is used, for example, in paging, inquiry and in response routines. In addition to the packet consisting of just the access code, the packet may be a combination of the access code and header or include the access code-header-payload as shown in FIG. 5A.

Each packet starts with an access code. If a packet header follows, the access code is 72 bits long, otherwise it is 68 bits long. The access code is used for synchronization, DC offset compensation and identification. The access code identifies all packets exchanged on a channel of the piconet. That is, all packets sent in the same piconet are preceded by the same channel access code (CAC). In the receiver of, for example, a Bluetooth compliant wireless device, the correlator correlates against the access code and triggers when a threshold is exceeded. This trigger signal is used to determine the receipt timing. Also, since the access code is used in paging in inquiry procedures, the access code itself acts as a signaling message and neither a header or a payload is present.

Figure 5B:
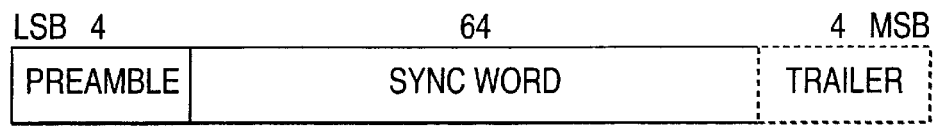

FIG. 5B of the drawings shows an access code format, which consists of a preamble (4 bits), a sync word (64 bits) and possibly a trailer (4 bits). There are three different types of access codes: channel access code (CAC), device access code (DAC) and inquiry access code (IAC). These three types of access codes are used in Bluetooth compliant devices during different operating modes. For example, the channel access code identifies a piconet. Namely, this code is included in all packets exchanged on the piconet channel. The device access code is used for special signaling procedures, e.g., paging and response to paging. Generally, the inquiry access code is used for inquiry procedure. Bluetooth (BT) defines two variations thereof. A channel inquiry access code (GIAC) which is common to all devices can be used to discover which of the Bluetooth units are in a piconet range. On the other hand, the dedicated inquiry access code (DIAC) can be used for addressing a group of BT units that show a common characteristic (i.e., the DIAC can be used to discovery only such specific Bluetooth units that are within range). In the invention, the codes available from the dedicated inquiry access code (DIAC) may be used as an alternative to introducing a new set of revised DIACs in connection with the present invention which features a simultaneous correlation involving at least two parallel arranged correlators.

In the access code format, the preamble facilitates DC compensation. The sync word which is a 64-bit code word is derived from a 24 bit address, which is the lower address part (LAP) of the Bluetooth device ID. For the channel access code (CAC), the master's LAP is used; for the GIAC and the DIAC, reserved dedicated LAPs are used and for the device access code (DAC) the slave unit LAP is used. This access code format in the packet format assures a sufficiently large Hamming distance between sync words based on different LAPs, thereby assuring greater accuracy in packet traffic flow.

Figure 5C:
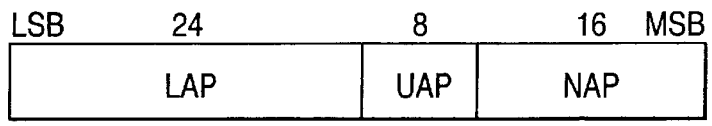

Currently access codes are derived from the device identifier (ID). Each Bluetooth device (Bluetooth transceiver) is allocated a unique 48-bit Bluetooth device address. This 48-bit address includes three fields: a lower address part (LAP) field, consisting of 24 bits; and an upper address part (UAP) field, consisting of 8 bits; and a non-significant address part (NAP) field consisting of 16 bits, as shown in FIG. 5C, which depicts the format of the Bluetooth device address (BD_ADDR), which is the device ID. A device ID is 48 bits of which only 32 are significant. The access code, however, uses only 24 lower bits (LAP) of the 48-bit ID. Therefore, there are a very large number of different access codes available. The access code generation procedure in a BT compliant device guarantees a minimum Hamming distance of 14.

The present invention modifies the connection state through facilitating a BT-compliant wireless device (wireless transceiver device) to use at least two codes for which to search simultaneously. Page and inquiry states do not need to be modified, since the upper protocol layers, like Link Manager (LM) and Link Controller (logical link control and adaptation protocol or L2CAP), can take care of distributing the capability and supported protocol information.

Figure 1:
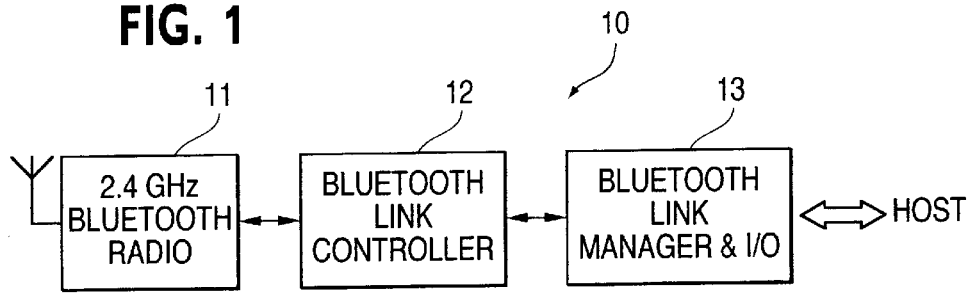
FIG. 1 shows the different functional blocks associated with the Bluetooth system, which is the basis for supporting communication between wireless devices according to the standard set by the Bluetooth SIG, applicable to the present invention.
Figure 6:
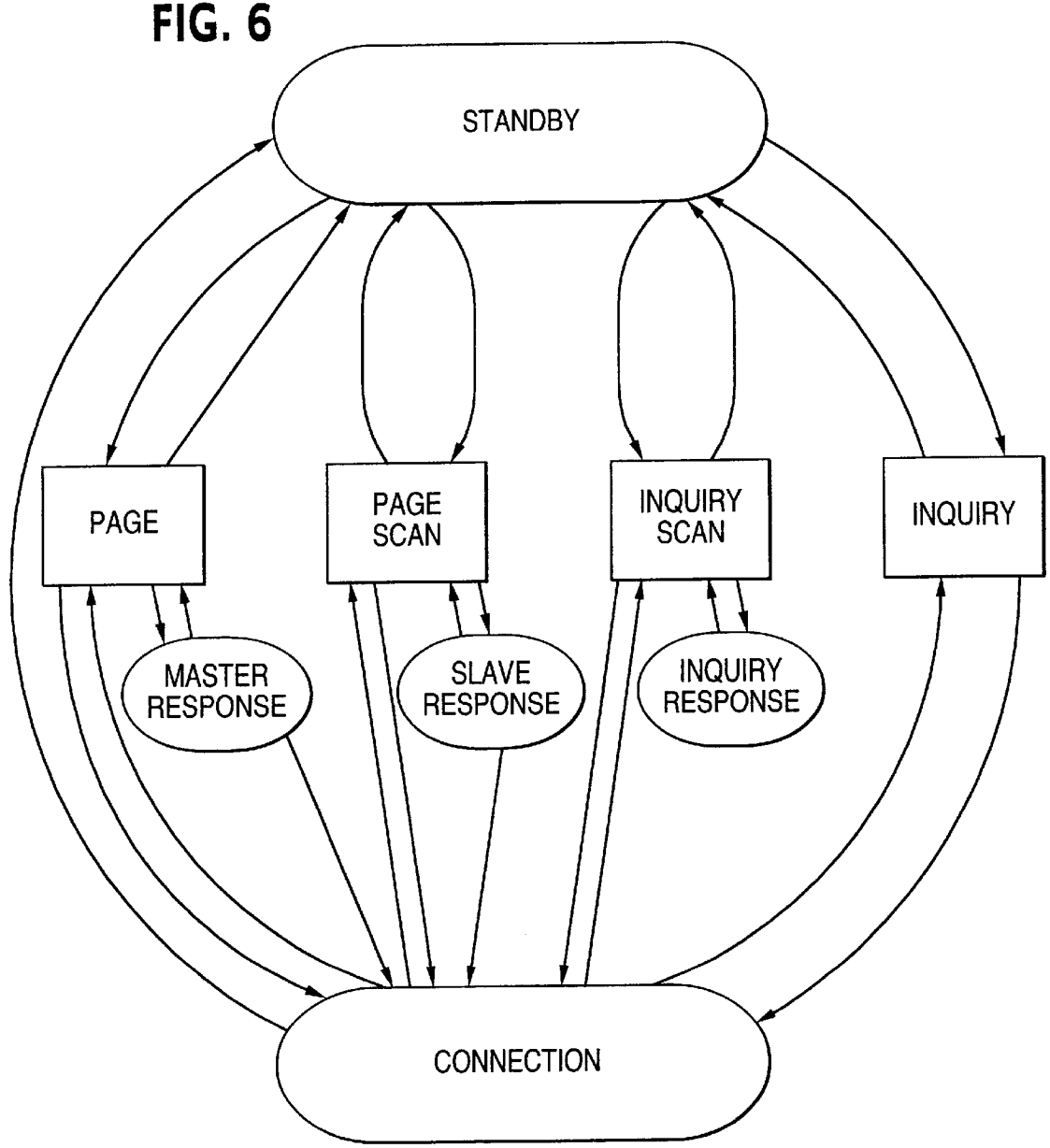
FIG. 6 shows a state diagram illustrating the different states and substates used in the Bluetooth Link Controller of the Bluetooth system, applicable to the present invention.
Figure 2A:
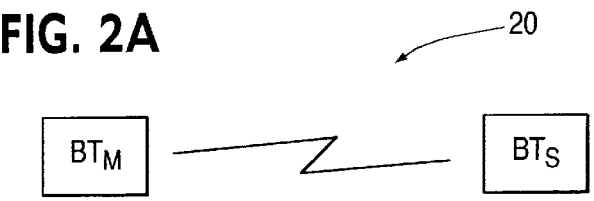
FIGS. 2A, 2B and 2C are examples of a point-to-point ad hoc connection, a point-to-multipoint ad hoc connection such as a piconet and a multiple piconet arrangement with overlapping coverage areas forming a scatternet, respectively, applicable to the present invention.
Figure 2B:
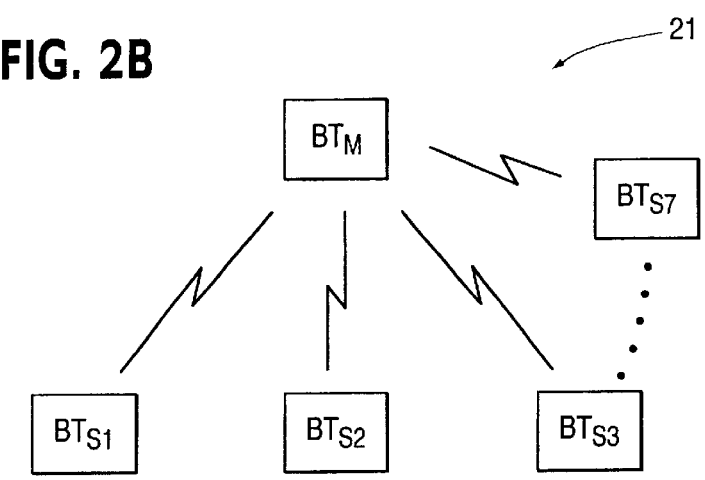
Figure 2C:
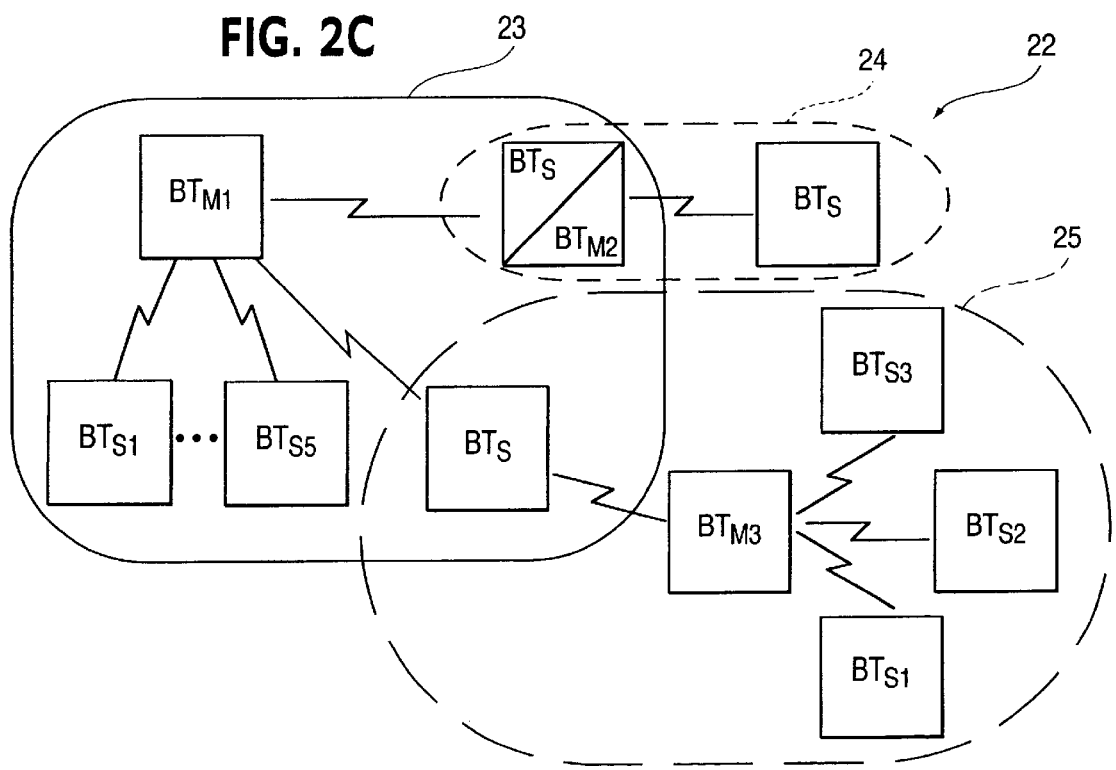

FIG. 6 of the drawings illustrates the different states used in the Bluetooth link controller. That is, the Bluetooth link controller supports the following state and substate operating modes: standby state, which is the default state; connection state; page, page scan, inquiry and inquiry scan substates; and master response, slave response and inquiry response substates. The substates are interim states that are used to add new slaves to a piconet, for example. To move from one state to the other, either commands from the Bluetooth link manager are used, or internal signals in the link controller are used (e.g., a trigger signal from a correlator and also the time-out signals). The controller may leave the STANDBY state to enter the page or inquiry scan substates for checking messages, or instead enter the page or inquiry substates. When responding to a page message, the unit will not return to the STANDBY state but enter the CONNECTION state as a slave unit. When carrying out a successful page attempt, the device will enter the CONNECTION state as a master unit.

In order to establish new connections, the inquiry and paging substates are used. Setting a transceiver in the inquiry substate enables a unit to discover other units which are located in a given area and what their device addresses and clocks are. On the other hand, the paging substate actually establishes new connections. Only the Bluetooth device address is required to set up a connection, and knowledge of the phase of the native clock of the intended slave unit would accelerate the set-up procedure. A transceiver that establishes a connection directs the page procedure and automatically becomes the master of the ad hoc connection. In the paging and inquiry substates, the DAC and the inquiry access code (GIAC or DIAC) are used, respectively. A unit in the page scan or inquiry scan substate, which is compliant for plural protocol versions, according to the present invention, simultaneously correlates against these respective access codes, for example, through employing an equal plural number of parallel arranged correlators, each being matched to a respective one of the plural protocol versions. That is, such dual correlation is effected at least during a page scan substate and an inquiry scan substate.

In the page scan substate, a unit listens for its own DAC for the duration of the scan window. While in the scan window, the unit listens at a single hop frequency so as to effect a match associated with its DAC, through one of its protocol versions (the protocol versions are matched to respective ones of the plural correlators). Typically, the scan window is long enough to completely scan 16-page frequencies. When a wireless transceiver device enters the page scan substate, it selects the scan frequency based on the hopping sequence of that unit. This is a 32-hop sequence (or 16-hop sequence in a reduced-hop system) in which each hop frequency is unique. This page-hopping sequence is determined by the devices in the Bluetooth device address. Every 1.28 s, a different hopping frequency is selected. A correlation match is effected when the correlator exceeds the trigger threshold during the page scan, in which case the transceiver device will enter the slave response substate.

The page scan substate can be entered from the STANDBY state or the CONNECTION state. In the STANDBY state, no connection has been established, and the transceiver device can use all the capacity to perform the page scan. Before entering the page scan substate from the CONNECTION state, however, the unit preferably reserves as much capacity for scanning. If desired, the unit may place ACL connections in the HOLD mode or even in the PARK mode. SCO connections, on the other hand, are preferably not interrupted by the page scan. Page scan may be interrupted by the reserved SCO slots which have higher priority than the page scan.

The transceiver device enters the inquiry substate when the destination's device address is unknown to the source. One can think of public facilities like printers or facsimile machines or access points to a LAN. Alternatively, the inquiry substate can be used to discover other BT units that are within a given range of that source for an already-formed piconet. During an inquiry substate, the discovering unit collects the Bluetooth device addresses and clock information of all other wireless devices that respond to the inquiry message. It may then, if desired, make a connection by entering the page substate. A transceiver device that wants to locate other Bluetooth-compliant transceiver devices continuously transmits the inquiry message (which is the ID packet) at different hop frequencies. The inquiry hop sequence is always derived from the LAP field of the GIAC, even when DIACs are used.

Both the inquiry scan substate and the page scan substate are very similar. However, instead of scanning for its own DAC, the receiver, in an inquiry scan substate, scans for the inquiry access code long enough to completely scan for 16 inquiry frequencies. The scan is performed at a single-hop frequency. As in the page procedure, the inquiry procedure uses 32 dedicated inquiry hop frequencies based on the inquiry hopping sequence. These frequencies are determined by the general inquiry address, and the clock phase is determined by the native clock of the device carrying out the inquiry scan, and it changes every 1.28 s.

If any inquiry message is recognized during an inquiry wake-up period, the Bluetooth unit enters the inquiry response substate. Similarly to the page scan substate, the inquiry scan substate can be entered either from the STANDBY state or the CONNECTION state. In the STANDBY state, no connection has been established, and the unit can use all the capacity to carry out the inquiry scan. Before entering the inquiry scan substate from the CONNECTION state, the unit preferably reserves as much capacity as possible for scanning. For example, the device unit may place ACL connections in the HOLD mode or even use the PARK mode. SCO (voice) connections are, preferably, not interrupted by the inquiry scan. In such a case, the inquiry scan may be interrupted by the reserved SCO slots, which have higher priority than the inquiry. Discussion regarding details/parameters associated with all substates in connection with Bluetooth-compliant transceivers are set in the Bluetooth SIG standard.

Discussion will turn back to the embodiment in FIG. 3 of the drawings and the additional supportive discussion directed thereto with regard to FIGS. 4A and 4B.

The receiver portion illustrated in FIG. 3 of the drawings employs a dual correlator and a dual packet de-composer scheme (although not limited thereto) in connection with effecting simultaneous correlation of an access code of an incoming data packet against that associated with two different wireless protocol versions, supported by that wireless device. That is, since we have two different protocols, two different protocol parsers/processors may be needed, depending on how different the protocols are. As the access code scheme guarantees full isolation of the protocol versions, the actual frame structure and its interpretation may be totally different in both versions.

Under current implementation of a BT-compliant transceiver device, which supports a single protocol version, only a single packet de-composer (packet parser) is required. Depending on the packet type, namely, asynchronous data (ACL) or voice (SCO), the packet flow is directed to separate queues. For example, the receive (RX) routine is carried out separately for the AOL link and the SCO link. FIG. 4B shows such an example, in which the ACL and SCO buffers as used in the RX routine. The RX ACL buffer consists of two FIFO (first-in first-out) registers. Using the switching connection convention shown in FIG. 4B, register 41 can be accessed and loaded by the Bluetooth Link Controller with the payload of the latest RX packet, and register 42 can be accessed by the Bluetooth Link Manager to read the previous payload. The RX 500 buffer also consists of a pair of FIFO registers. Namely, register 43 is filled with newly arrived voice information, while register 44 can be read by the voice processing unit. Packet de-composer 37.1 or 37.2 in the embodiment of FIG. 3 may be similar to packet de-composer 45 in FIG. 4B.

Since the header of the receive packet indicates whether the payload contains data and/or voice, the packet de-composer is able to automatically direct the traffic to the proper buffers. Switch S1 (S1a, S1b) changes each time the link manager (LM) has read the old register. If the payload arrives before the RX register is emptied, a STOP indication must be included in the packet header of the next transmission (TX) packet that is returned. The STOP indication is removed again as soon as the RX register is emptied. The sequential numbering (SEQN) field is checked before a new ACL payload is stored into the ACL register so as to avoid any undesired influence on the outcome.

Turning back to the illustration in FIG. 3, an RF modem 31 is coupled to an antenna port and transmits a receipt signal to demodulator 32, where the signal is demodulated and is to be sampled as packet data. The output from the demodulator is either in the form of hard bits (i.e., the received bit is in the form of definite 1's and 0's bits) or soft bits, where the signal is more like an analog output from (in the case of BT) frequency discriminator (e.g., FM demodulator). The data is assumed to be sampled at that point and is in the form of a data bit stream, which might be and is assumed to be oversampled in order to facilitate good synchronization of the receiver to the bit stream, or digital samples from an A/D (analog-to-digital) converter in the case of soft bits. The hard bit stream or converted digital samples from A/D converter is simultaneously fed into correlators 33 and 34. The correlators 33 and 34, which correspond in number to the number of wireless protocol versions supported by that device, correlate the access code for the packet bit stream to that one of the correlators programmed with a matching protocol.

The triggering by the protocol-matching correlator controls the timing of the sampler 36, via the control and timer extractor 35, so as to synchronize the sampling timing of the packet bit stream to be matched to the appropriate protocol. The purpose of the timing extractor 35 is the acquisition and maintaining of the packet level and bit level synchronization. Bit level synchronization is needed by the sampler 36 so as to generate the actual received bit stream from oversampled soft bits or hard bits. The actual bit stream is at the actual bit rate. The bit stream is then parsed by the packet de-composers. The selection between the two parsers 37.1 and 37.2 is based on the correlator output. That is, if correlator 33 is triggered, then the packet de-composer 37.1 is selected and if, on the other hand, correlator 34 is triggered, then the packet de-composer 37.2 is selected.

The flowchart in FIG. 4A depicts the functionality of the control and timing extractor. The "wait for signal from correlator" feature monitors the outputs from correlators 33 and 34 and based on the outcome of the dual correlation, a selection is made by the control and timing extractor 35 to trigger the appropriate one of the two packet de-composers. As to implementation of the example according to FIG. 3, a microcontroller may be used to take care of the functions occurring after the sampler 36 and timing extractor 35. Functionality of the system as it relates to the FIG. 3 illustration is to detect (e.g., by the two correlators) the matching protocol versions and then to process each such matched protocol accordingly (e.g., through either the packet de-composer 1 or 2 and through switch control and use of the receive ACL/SCO buffers, store the data (ACL or SCO) into the logically appropriate buffer).

Correlator building blocks may include a delay line and an array of multiply-add modules. An example of this is given in FIG. 7A, in which input data moves along the delay line built from register elements D. The input data is transmitted from d1 to d2, d2 to d3, and so forth, generally, in an unaltered fashion. That is, generally, the data at location $dn+1=dn$ at each clock cycle. If the system uses oversampled data, oversampling by a factor of N, then each successive delay element causes a delay of N cycles. The delay line contents are multiplied by waiting factors $c1$, $c2 \ldots$, $cn$, and the multiplication results at each stage location are added to that of the succeeding stage to form the output value Out ($c1d1+c2d2+ \ldots +cndn$). As it relates to the present invention, the access code can be mapped so that to the weight of the bit value (logic level) 0 corresponds to the signed weight −1 and bit value (logic level) 1 to numeral weight value 1. It is apparent, therefore, that the multiply-add feature in FIG. 7A can be reduced to that of an add-subtract function.

With regard to a soft bit correlator, the fundamental building block is an add-subtract element. FIG. 7B illustrates a module 70 having bit-vector inputs A and B. Another 1-bit input C effects selection between addition or subtraction. If input C=0, then output Q=A+B, else Q=A−B. In this example implementation of the module, it is assumed that A and B are signed two's complement presentation of the single value. There is two's complement adder with carry bit input where inputs A and B are bit vectors, and C is 1-bit carry input. A module input B can be fed to the adder 71 as such or bit-wise inverted. The inversion and selection is done by a MUX (multiplexer) 72 with an inverting input.

The MUX is controlled by the module input C such that the inverting operation is selected for input B when the input C is high. Therefore, if C=0, then the MUX output is B, else the output would be (not B). If the required arithmetic is carried out, it can be shown that the functionality of the add/subtract module can be achieved in the correlator of FIG. 7A through use of an add-subtract module as that shown in FIG. 7B. Practically, the inversion can usually be absorbed into the adder logic so that they are not clearly separable.

Figure 7A:
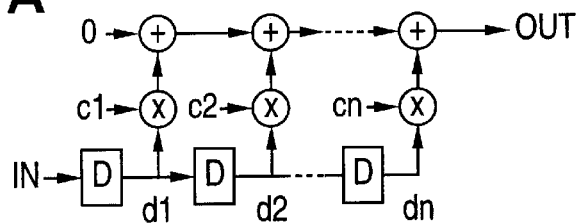
FIGS. 7A, 7B and 7C show examples of a correlator building block including a delay line and an array of multiply-add modules, an example of an add-subtract module which may be substituted for the multiply-add module type and an example of the correlator scheme (i.e., universal correlator) of FIG. 7A, using instead such add-subtract modules, which may be used in the dual correlator scheme of the present invention, respectively.
Figure 7B:
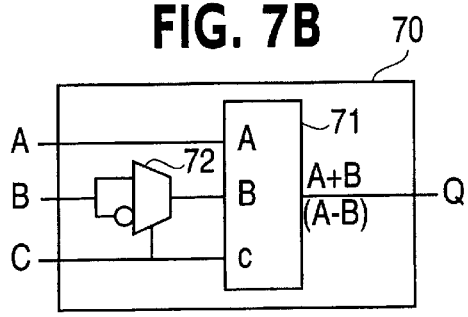
Figure 7C:
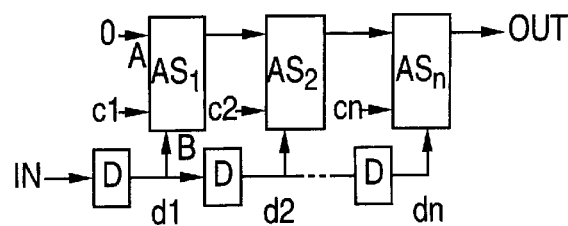

If such multiple-add modules are replaced with add-subtract modules (AS), the correlator structure such as that of FIG. 7A would be structured as that shown in FIG. 7C. In FIG. 7C, single-bit values c1 . . . cn in terms of the related add-subtract modules (AS) relate to input C of FIG. 7B. Delay line data d1 . . . dn is routed to the respectively corresponding AS inputs B. The summation chain is formed by routing the AS output Q from a preceding stage to the succeeding stage AS input A. In the present case, the longest path is from the $AS_1$ stage input A (having a normally 0 input bias) to the $AS_n$ stage output Q. In order to reduce the path and thereby speed up the summing process, the AS modules may be routed so that the units can perform the calculations in parallel. This can be achieved by arranging the modules into a tree-like structure or several parallel paths which converge finally in the last stages.

Figure 8:
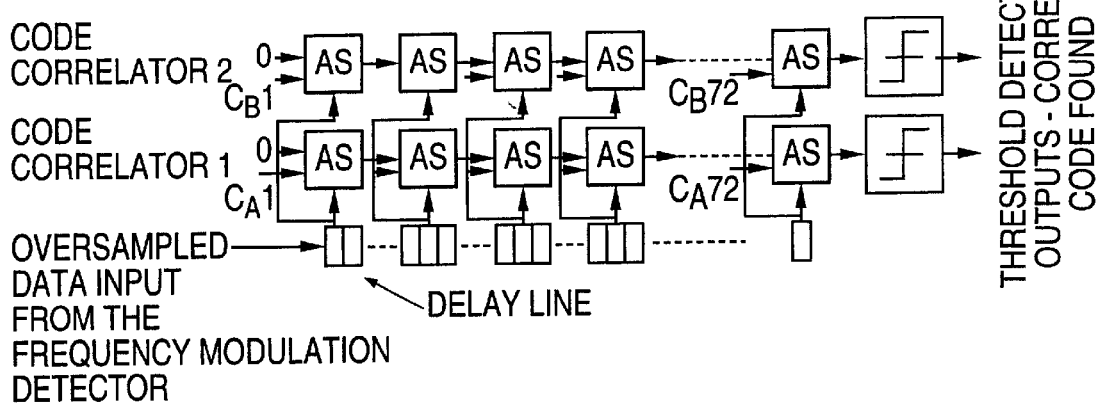
FIG. 8 is an example implementation of the dual correlator scheme of the present invention, which employs two series of add-subtract modules and which performs downsampling of the data (oversampled data) input.

When applied to the correlators of the present invention, signals c1, c2 . . . , cn represent the bits of the access code, where c takes bit values of 0 or 1. That is, bit vector c1 . . . cn=access code when applying such correlators to that of the present invention, including in the example of FIG. 3 of the drawings. Specifically, when applying use of add-subtract modules (AS) to that of the dual correlator scheme of FIG. 3, the dual correlator scheme shown in FIG. 8 results. Each correlator in FIG. 8 is programmed to search out, for example, the device access code (DAC) of that device to effect a correlation match with one of the correlators. If the correlation output value reaches a level greater than the set threshold of the value directed thereto, a valid transmission has been detected, whereby processing of the received information packet can begin. It is noted that the number of AS elements in each of the two correlators is 72 (this number corresponds to the number of bits in the channel access code). Correspondingly, bit vector $c_{A1} \ldots c_{A72}$, as well as bit vector $c_{B1} \ldots c_{B72}$, represent the access code supported by the protocol versions associated with those correlators.

Figure 9:
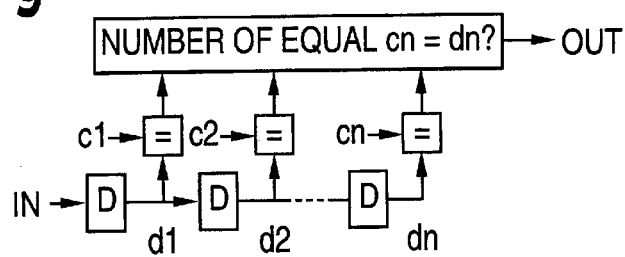
FIG. 9 is an example of an alternative hard-bit correlator which can be used in implementing the dual correlator as applied to the present invention.

Use of a hard bit correlator such as in FIG. 9 is simpler than implementing add-subtract features associated with FIG. 7B. Instead of multivalued input data, the input takes values of 0 and 1, which only simplifies the correlator even more. That is, instead of adding or subtracting signed integer values, dn and cn are compared (e.g., all outcomes dn and access code cn are XORed together pairwise). The outputs from the comparators are fed into a summation tree, such as shown in FIG. 9, that counts the number of times cn=dn. Using this scenario, and following the same guidelines as that used in connection with implementing the dual correlator scheme in FIG. 8, it becomes straightforward to modify the figure for the hard-bit correlation scheme thus replacing the AS network with comparators and count "number of equal cn=dn" modules.

As an example, a sample of different access codes were taken from the BT SIG specification access code sample data table in connection with simulating the scenario of the dual correlator scheme such as applied in FIG. 3 (FIG. 8) of the drawings. For example, correlator 1 is programmed for the device ID OX616cec (hexadecimal notation) and correlator 2 is programmed for the device ID OX616ceb. The input data consisted of 500 samples of random noise followed by 72-bit access code (4-bit preamble, 64-bit sync word, 4-bit trailer). See FIG. 5B. After, the access code follows 100 bits of 1's. This system employed uses five times oversampling for the correlators, i.e., for each bit, five samples occur. It could be seen that when the expected correlator triggers (protocol matched correlator), it produces a clear peak which is indicative that a correct access code has been found. The other access code produces a peak also, but one that is considerably smaller at the point of highest peak of the former (the codes are guaranteed, for example, to have a Hamming distance of 14). Also, when there is noise on the input side, the output of the correlators are likewise noiselike, without any clear peaking. The ratio between the noise level and the peak depends on the received signal quality. The control block 35 in FIG. 3 monitors the correlator outputs and when a suitably high threshold has been exceeded, it is an indication that the data packet has been found. Depending on which of the correlators produces the peak, the corresponding packet parser is selected.

This concludes the description of the example embodiments. Although the present invention has been described with reference to a number of illustrated embodiments thereof, it should be understood that numerous other modifications and examples can be devised by those skilled in the art that will fall within the spirit and scope of the principles of this invention. Also, reasonable variations and modifications are possible in the component parts and/or arrangements associated with the present invention that are within the scope of the foregoing disclosure, the drawings and the appended claims without departing from the spirit of the invention. In addition to variations and modifications that are possible, alternative uses will also be apparent to those skilled in the art.

What is claimed is:

1. A communication system for providing at least one network and comprising wireless devices which operate on certain radio frequencies, at least one of said wireless devices including a transceiver having a receiver portion which simultaneously correlates an access code of an incoming data packet against that associated with plural wireless protocol versions, supported by that wireless device, in a manner to permit a linkup between that wireless device and other ones of said wireless devices including those which support a linkup in accordance with only one of said plural wireless protocol versions, wherein the receiver portion of each of said wireless devices includes as many correlators as are the number of wireless protocol versions each such wireless device supports, and wherein said plural wireless protocol versions include at least two ISM (Industrial Scientific Medical) frequency band protocol versions, one of which is a relatively more advanced version of the other.

2. The communication system according to claim 1, wherein said ISM frequency band is a 2.4 GHz ISM radio band for frequency hopping spread spectrum (FHSS) communication.

3. The communication system according to claim 2, wherein said wireless devices conform to the Bluetooth standard for FHSS communication.

4. A communication system for providing at least one network and comprising wireless devices which operate on certain radio frequencies, at least one of said wireless devices including a transceiver having a receiver portion which simultaneously correlates an access code of an incoming data packet against that associated with plural wireless protocol versions, supported by that wireless device, in a manner to permit a linkup between that wireless device and other ones of said wireless devices including those which support a linkup in accordance with only one of said plural wireless protocol versions, wherein the receiver portion of each wireless device supporting plural wireless protocol versions includes:

an RF modem which is coupled to an antenna port and which transmits a received signal to a demodulator where the signal is demodulated and is to be sampled as packet data; at least two correlators which are simultaneously fed with a packet bit stream of the demodulated signal, the correlators which are equal in number to the number of wireless protocol versions supported by each such wireless device correlate the access code of the packet bit stream to that one of the correlators programmed with a matching protocol; a sampler which samples and synchronizes the timing of the packet bit stream to the matched protocol; and based on a matching effected by the correlation, the sampled packet bit stream is transmitted via a protocol matching parser to buffer registers.

5. The communication system according to claim 4, wherein the packet bit stream includes both asynchronous connection-less (ACL) data and synchronous connection-oriented (SCO) data, and wherein the protocol matching parser separates the packet bit stream into ACL and SCO data which is transmitted to ACL and SCO buffer registers, respectively.

6. The communication system according to claim 4, wherein the packet bit stream includes at least synchronous connection-oriented (SCO) data packets carrying both data and voice traffic.

7. The communication system according to claim 4, wherein said wireless devices comprise terminals taken from the group consisting of a wireless phone, a Personal Digital Assistant (PDA), a palmtop device, a portable computer with wireless capability and with/without phone hookup capability, and public facilities with wireless capability like printers, facsimile machines, and access points to a local area network (LAN), although not limited thereto.

8. The communication system according to claim 5, wherein said protocol matching parser is one of a plurality of packet de-composers matched in number to the number of correlators, each of said packet de-composers is matched with a respective one of said correlators on the basis of its protocol.

9. The communication system according to claim 8 wherein said receiver portion includes at least two correlators to simultaneously correlate against an inquiry access code while in an inquiry scan substate.

10. The communication system according to claim 8, wherein said receiver portion includes at least two correlators to simultaneously correlate against a device access code while in a page scan substate.

11. A communication system for providing at least one network and comprising wireless devices which operate on certain radio frequencies, at least one of said wireless devices including a transceiver having a receiver portion which simultaneously correlates an access code of an incoming data packet against that associated with plural wireless protocol versions, supported by that wireless device, in a manner to permit a linkup between that wireless device and other ones of said wireless devices including those which support a linkup in accordance with only one of said plural wireless protocol versions, wherein the receiver portion of each of said wireless devices includes as many correlators as are the number of wireless protocol versions each such wireless device supports, and wherein said receiver portion simultaneously correlates against an inquiry access code while in an inquiry scan substate.

12. A communication system for providing at least one network and comprising wireless devices which operate on certain radio frequencies, at least one of said wireless devices including a transceiver having a receiver portion which simultaneously correlates an access code of an incoming data packet against that associated with plural wireless protocol versions, supported by that wireless device, in a manner to permit a linkup between that wireless device and other ones of said wireless devices including those which support a linkup in accordance with only one of said plural wireless protocol versions, wherein the receiver portion of each of said wireless devices includes as many correlators as are the number of wireless protocol versions each such wireless device supports, and wherein said receiver portion simultaneously correlates against a device access code while in a page scan substate.

13. A wireless device, for use in an ad hoc network including a plurality of wireless devices, having a transceiver including a receiver portion which simultaneously correlates an access code of an incoming data packet against that associated with plural wireless protocol versions, supported by that wireless device, in a manner to permit a linkup between that wireless device and all other ones of said wireless devices, the said other ones of said wireless devices include ones which are programmed to correlate against only a single one of said protocol versions as well as ones which are programmed to simultaneously correlate against said plural protocol versions, wherein the receiver portion thereof includes as many correlators as are the number of wireless protocol versions each said device supports, and wherein said plural wireless protocol versions include at least two ISM (Industrial Scientific Medical) frequency band protocol versions, one of which is a relatively more advanced version of the other.

14. The wireless device according to claim 13, wherein said ISM frequency band is a 2.4 GHz ISM radio band for frequency hopping spread spectrum (FHSS) communication.

15. The wireless device according to claim 14, wherein said wireless devices conform to the Bluetooth standard for FHSS communication.

16. A wireless device, for use in an ad hoc network including a plurality of wireless devices, having a transceiver including a receiver portion which simultaneously correlates an access code of an incoming data packet against that associated with plural wireless protocol versions, supported by that wireless device, in a manner to permit a linkup between that wireless device and all other ones of said wireless devices, the said other ones of said wireless devices include ones which are programmed to correlate against only a single one of said protocol versions as well as ones which are programmed to simultaneously correlate against said plural protocol versions, wherein the receiver portion of each wireless device supporting plural wireless protocol versions includes:

an RF modem which is coupled to an antenna port and which transmits a received signal to a demodulator where the signal is demodulated and is to be sampled as packet data; at least two correlators which are simultaneously fed with a packet bit stream of the demodulated signal, the correlators which are equal in number to the number of wireless protocol versions supported by each such wireless device correlate the access code of the packet bit stream to that one of the correlators programmed with a matching protocol; a sampler which samples and synchronizes the timing of the packet bit stream to the matched protocol; and based on a matching effected by the correlation, the sampled packet bit stream is transmitted via a protocol matching parser to buffer registers.

17. The wireless device according to claim 16, wherein the packet bit stream includes both asynchronous connection-less (ACL) data and synchronous connection-oriented (SCO) data, and wherein the protocol matching parser separates the packet bit stream into ACL and SCO data which is transmitted to ACL and SCO buffer registers, respectively.

18. The wireless device according to claim 16, wherein the packet bit stream includes at least synchronous connection-oriented (SCO) data packets carrying both data and voice traffic.

19. The wireless device according to claim 16, wherein said wireless devices comprise terminals taken from the group consisting of a wireless phone, a Personal Digital Assistant (PDA), a palmtop device, a portable computer with wireless capability and with/without phone hookup capability, and public facilities with wireless capability like printers, facsimile machines, and access points to a local area network (LAN), although not limited thereto.

20. The wireless device according to claim 17, wherein said protocol matching parser is one of a plurality of packet de-composers matched in number to the number of correlators, each of said packet de-composers is matched with a respective one of said correlators on the basis of its protocol.

21. A wireless device, for use in an ad hoc network including a plurality of wireless devices, having a transceiver including a receiver portion which simultaneously correlates an access code of an incoming data packet against that associated with plural wireless protocol versions, supported by that wireless device, in a manner to permit a linkup between that wireless device and all other ones of said wireless devices, the said other ones of said wireless devices include ones which are programmed to correlate against only a single one of said protocol versions as well as ones which are programmed to simultaneously correlate against said plural protocol versions, wherein the receiver portion thereof includes as many correlators as are the number of wireless protocol versions each said device supports, and wherein said receiver portion correlates against an inquiry access code while in an inquiry scan substate with a protocol matching correlator.

22. A wireless device, for use in an ad hoc network including a plurality of wireless devices, having a transceiver including a receiver portion which simultaneously correlates an access code of an incoming data packet against that associated with plural wireless protocol versions, supported by that wireless device, in a manner to permit a linkup between that wireless device and all other ones of said wireless devices, the said other ones of said wireless devices include ones which are programmed to correlate against only a single one of said protocol versions as well as ones which are programmed to simultaneously correlate against said plural protocol versions, wherein the receiver portion thereof includes as many correlators as are the number of wireless protocol versions each said device supports, and wherein said receiver portion correlates against a device access code while in a page scan substate with a protocol matching correlator.

23. A method for facilitating, in a communication system, an ad hoc connection between different ones of plural wireless transceiver devices which are supported by different protocol versions, comprising:

providing at least one wireless transceiver device with a receiver portion to simultaneously correlate an incoming data packet against a plurality of protocol versions, synchronizing the timing of a sampling of the incoming data packet to produce a packet bit stream conforming to the protocol version matched by the correlation, and based on a matching effected by the correlation, transmitting the packet bit stream via a protocol matching parser to at least one of asynchronous data signal buffer registers and synchronous voice signal buffer registers, wherein the providing of at least one wireless transceiver device with a receiver portion to simultaneously correlate includes providing at least two correlators which simultaneously correlate an access code of the incoming data packet, said at least two correlators are equal in number to the number of protocol versions each such wireless device supports.

24. The method according to claim 23, wherein said plural wireless protocol versions include at least two ISM (Industrial Scientific Medical) frequency band protocol versions, one of which is a relatively more advanced version of the other.

25. The method according to claim 24, wherein said ISM frequency is a 2.4 GHz ISM radio band for frequency hopping spread spectrum (FHSS) communication.

26. The method according to claim 25, wherein said wireless devices conform to the Bluetooth standard for FHSS communication.

27. The method according to claim 23, wherein each wireless device in said ad hoc network includes a transceiver supported by a Bluetooth system having a 2.4 GHz ISM radio, a link controller and a support unit for link management and host terminal interface.

28. The method according to claim 23, wherein the transmitting of the packet bit stream via the protocol matching parser includes transmitting the packet bit stream to said at least one of asynchronous data signal buffer registers and synchronous voice signal buffer registers via one of a plurality of packet de-composers programmed to the matched protocol of the correlation, said plurality of packet de-composers being equal in number to the number of correlators.

29. The method according to claim 28, wherein the packet bit stream consists of at least one of asynchronous connection-less (ACL) data packets and synchronous connection-oriented (SCO) data packets.

30. The method according to claim 29, wherein the SCO packets carry both data and voice traffic.

31. The method according to claim 28, wherein said receiver portion simultaneously correlates against an inquiry access code while in an inquiry scan substate.

32. The method according to claim 31, wherein said receiver portion simultaneously correlates against a device access code while in a page scan substate.

33. The method according to claim 28, wherein said receiver portion simultaneously correlates against a device access code while in a page scan substate.

34. The method according to claim 27, wherein the link controller of said Bluetooth system associated with each wireless device in the ad hoc connection supports the following state and substate operating modes: standby state, which is the default state; connection state; page, page scan, inquiry and inquiry scan substates; and master response, slave response and inquiry response substates.

* * * * *